(12) United States Patent
Yamane et al.

(10) Patent No.: US 9,733,896 B2
(45) Date of Patent: Aug. 15, 2017

(54) SYSTEM, APPARATUS, AND METHOD FOR DISPLAYING VIRTUAL OBJECTS BASED ON DATA RECEIVED FROM ANOTHER APPARATUS

(71) Applicant: NINTENDO CO., LTD., Kyoto (JP)

(72) Inventors: Tomoyoshi Yamane, Kyoto (JP); Hirotoshi Ishibai, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 68 days.

(21) Appl. No.: 14/630,058

(22) Filed: Feb. 24, 2015

(65) Prior Publication Data

US 2015/0254511 A1    Sep. 10, 2015

(30) Foreign Application Priority Data

Mar. 5, 2014   (JP) ................................ 2014-042871

(51) Int. Cl.
*G06K 9/00* (2006.01)
*G06F 3/16* (2006.01)
*G06T 11/60* (2006.01)
*G06T 11/00* (2006.01)

(52) U.S. Cl.
CPC .............. *G06F 3/167* (2013.01); *G06T 11/00* (2013.01)

(58) Field of Classification Search
None
See application file for complete search history.

(56) References Cited

U.S. PATENT DOCUMENTS

| | | | |
|---|---|---|---|
| 2008/0071559 A1* | 3/2008 | Arrasvuori | G06Q 30/06 705/26.1 |
| 2008/0183678 A1* | 7/2008 | Weston | G06F 17/30867 |
| 2011/0072500 A1* | 3/2011 | Varghese | G06F 21/32 726/7 |
| 2012/0218298 A1* | 8/2012 | Hayakawa | G06F 3/011 345/633 |
| 2015/0189476 A1* | 7/2015 | Tanaka | H04W 4/028 455/457 |

OTHER PUBLICATIONS

H. Kato et. al., "An Augmented Reality System and its Calibration based on Marker Tracking", TVRSJ, vol. 4, No. 4, 1999 (10 pages) with its partial English translation (2 pages).

* cited by examiner

*Primary Examiner* — Kee M Tung
*Assistant Examiner* — Yanna Wu
(74) *Attorney, Agent, or Firm* — Nixon & Vanderhye PC

(57) ABSTRACT

In accordance with control data that controls a virtual object image and has been acquired by another apparatus, a display form of the virtual object image is set. Then, the virtual object image based on data representing the display form is displayed in a captured image to be displayed on a display apparatus.

22 Claims, 11 Drawing Sheets

SYSTEM, APPARATUS, AND METHOD FOR DISPLAYING VIRTUAL OBJECTS BASED ON DATA RECEIVED FROM ANOTHER APPARATUS

CROSS REFERENCE TO RELATED APPLICATION

The disclosure of Japanese Patent Application No. 2014-042871, filed on Mar. 5, 2014, is incorporated herein by reference.

FIELD

The technology shown here relates to an information processing system, an information processing apparatus, a storage medium having stored therein an information processing program, and an information processing method, and in particular, relates to an information processing system, an information processing apparatus, and an information processing method for, for example, displaying a predetermined image in accordance with an input to another apparatus, and a storage medium having stored therein an information processing program for, for example, displaying a predetermined image in accordance with an input to another apparatus.

BACKGROUND AND SUMMARY

Conventionally, there is a technique for detecting a predetermined image capturing target from an image (a captured image) captured by image capturing means such as a camera and displaying a virtual object in accordance with the detected image capturing target. For example, in the above technique, in augmented reality technology, an image recognition process is performed on a marker included in a captured image captured by a camera. If the marker has been detected, a virtual object is combined with the captured image based on the marker position, and the combined image is displayed.

The above technique, however, merely displays a virtual object corresponding to an image capturing target. Thus, there is room for improvement in displaying a virtual object in a more interesting manner.

Therefore, it is an object of an exemplary embodiment to provide an information processing system, an information processing apparatus, and an information processing method that are capable of enhancing interest when displaying a virtual object in a captured image, and a storage medium having stored therein an information processing program capable of enhancing interest when displaying a virtual object in a captured image.

To achieve the above object, the exemplary embodiment can employ, for example, the following configurations. It should be noted that it is understood that, to interpret the descriptions of the claims, the scope of the claims should be interpreted only by the descriptions of the claims. If there is a conflict between the descriptions of the claims and the descriptions of the specification, the descriptions of the claims take precedence.

In an exemplary configuration of an information processing system according to an exemplary embodiment, an information processing system includes an information processing apparatus for displaying a virtual object image in a real space image and another apparatus capable of communicating with the information processing apparatus. Each of the information processing apparatus and the other apparatus includes one or more processors. The one or more processors of the other apparatus is configured to acquire control data for controlling the virtual object image. The one or more processors of the information processing apparatus or the other apparatus is configured to set a display form of the virtual object image in accordance with the control data. The one or more processors of the other apparatus is further configured to transmit data representing the display form set in the setting of the virtual object image and/or the control data to the information processing apparatus. The one or more processors of the information processing apparatus is configured to: acquire a captured image captured by an image capturing apparatus; acquire data transmitted from the other apparatus; and display, in the captured image to be displayed on a display apparatus, the virtual object image based on the data representing the display form.

Based on the above, in accordance with control data acquired by another apparatus, the display form of a virtual object image to be displayed in a captured image changes. This makes it possible to provide an interesting image.

In addition, in the acquisition of the control data, data representing a user input to the other apparatus may be acquired as the control data.

Based on the above, in accordance with a user input to the other apparatus, the display form of the virtual object image to be displayed in the captured image changes. This makes it possible to provide a more interesting image.

In addition, in the transmission, if the information processing apparatus is located at a particular place, the data representing the display form and/or the control data may be allowed to be transmitted to the information processing apparatus.

Based on the above, this effectively motivates a user of an information processing apparatus to visit a particular place.

In addition, in the transmission, if the information processing apparatus is located at the particular place and the other apparatus is located at a particular place different from the particular place, the data representing the display form and/or the control data may be allowed to be transmitted to the information processing apparatus.

Based on the above, this effectively motivates the user of the information processing apparatus and a user of the other apparatus to visit particular places different from each other.

In addition, in the setting of the virtual object image, if the information processing apparatus is located at the particular place, a virtual object set uniquely for the particular place may be set as the display form.

Based on the above, to display a uniquely set virtual object, the user of the information processing apparatus needs to visit the particular place. This effectively motivates the user to visit the particular place.

In addition, in the setting of the virtual object image, a user character set by a user of the other apparatus may be set as the display form.

Based on the above, it is possible, by communicating with the other apparatus, to display a virtual object unique to a user of the other apparatus.

In addition, the one or more processors of the information processing apparatus may be further configured to: acquire an image of a user of the information processing apparatus captured in real time by the image capturing apparatus or an image capturing apparatus different from the image capturing apparatus; and transmit data representing the image of the user to the other apparatus. The one or more processors of the other apparatus may be further configured to: acquire the data transmitted from the information processing apparatus; and display the image of the user of the information processing apparatus on a display apparatus, using the data acquired from the information processing apparatus.

Based on the above, it is possible to confirm the state of a user of an information processing apparatus on the other apparatus side.

In addition, the one or more processors of the other apparatus may be further configured to acquire a sound input to the other apparatus. In the transmission in the other apparatus, data representing the sound input to the other apparatus may be further transmitted to the information processing apparatus. In the acquisition of the data in the information processing apparatus, the data representing the sound input to the other apparatus transmitted from the other apparatus may be further acquired. The one or more processors of the information processing apparatus may be further configured to: output a sound corresponding to the sound input transmitted from the other apparatus; acquire a sound input to the information processing apparatus; and transmit, to the other apparatus, data representing the sound input to the information processing apparatus. The one or more processors of the other apparatus may be further configured to: acquire the data representing the sound input to the information processing apparatus transmitted from the information processing apparatus; and output a sound corresponding to the sound input transmitted from the information processing apparatus.

Based on the above, sounds are transmitted to both apparatuses and output. Thus, users who operate the respective apparatuses can recognize each other as if the user were close to each other.

In addition, in the acquisition of the control data, data representing a sound input to the other apparatus may be acquired as the control data. In the setting of the virtual object image, an action of the virtual object may be set based on the sound input to the other apparatus, and a display form of the virtual object image corresponding to the action may be set. In the transmission in the other apparatus, data representing the sound input to the other apparatus may be further transmitted to the information processing apparatus. In the acquisition of the data in the information processing apparatus, the data representing the sound input to the other apparatus transmitted from the other apparatus may be further acquired. The one or more processors of the information processing apparatus may be further configured to output a sound corresponding to the sound input transmitted from the other apparatus.

Based on the above, it is possible to control the action of a virtual object in accordance with a sound input to the other apparatus.

In addition, in the transmission, if the other apparatus can communicate with the information processing apparatus via a particular access point installed at the particular place, the data may be allowed to be transmitted to the information processing apparatus.

Based on the above, it is possible, only by specifying an access point, to set the particular place to which the user of the information processing apparatus is to be led, using the range where the access point can communicate.

In addition, the exemplary embodiment may be carried out in the forms of an information processing apparatus, a storage medium having stored therein an information processing program, and an information processing method.

According to the exemplary embodiment, in accordance with control data acquired by another apparatus, the display form of a virtual object image to be displayed in a captured image changes. This makes it possible to provide an interesting image.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 2 is a diagram showing a non-limiting example of a first stage, where a virtual character PC is displayed on the information processing apparatus 5 in the information processing system 1a;

FIG. 3 is a diagram showing a non-limiting example of a second stage, where the virtual character PC is displayed on the information processing apparatus 5 in the information processing system 1a;

FIG. 8 is a diagram showing a non-limiting example where virtual characters PCe to PCf are displayed on the information processing apparatus 5a;

DETAILED DESCRIPTION OF NON-LIMITING EXAMPLE EMBODIMENTS

Figure 1:
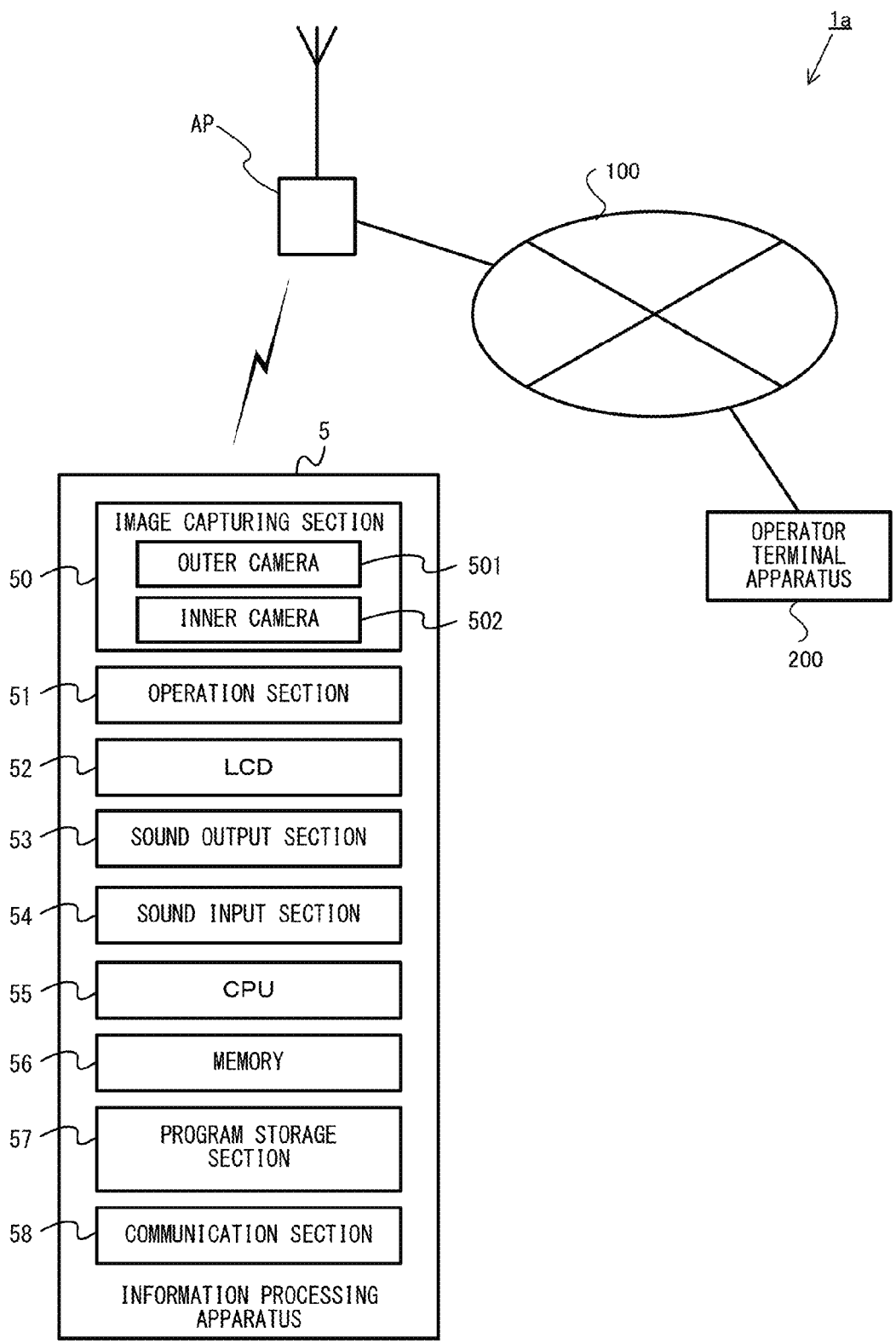
FIG. 1 is a block diagram showing a non-limiting example of an information processing system 1a, which includes an information processing apparatus 5.

With reference to FIG. 1, a description is given of an information processing system including an information processing apparatus for executing an information processing program according to an exemplary embodiment. It should be noted that FIG. 1 is a block diagram showing an example of an information processing system 1a, which includes an information processing apparatus 5. As shown in FIG. 1, the information processing system 1a is constructed by the connection between the information processing apparatus 5 and an operator terminal apparatus 200 via an access point AP and a network 100, the information processing apparatus 5 and the server 200 placed remotely from each other.

The information processing apparatus 5 is configured to connect to the network 100 via the access point AP using wireless communication. The information processing apparatus 5 can communicate with the operator terminal apparatus 200 by establishing a connection with the operator terminal apparatus 200 via the network 100. For example, the information processing apparatus 5 can execute a program stored in a storage medium such as an exchangeable memory card or an exchangeable optical disk, or received from a server or another apparatus. The information processing apparatus 5 may be a handheld game apparatus, or may be a device such as a general personal computer, a mobile phone, or a PDA (Personal Digital Assistant).

The information processing apparatus 5 includes an image capturing section 50, an operation section 51, an LCD 52, a sound output section 53, a sound input section 54, a CPU 55, a memory 56, a program storage section 57, a communication section 58, and the like. It should be noted that the information processing apparatus 5 may be composed of one or more apparatuses including: an information processing apparatus having at least the CPU 55; and another apparatus.

The CPU 55 is an example of information processing means (a computer) for executing various types of information processing. The CPU 55 has the function of, as the various types of information processing, receiving data transmitted from the operator terminal apparatus 200 via the communication section 58, and executing processing based on the data, and the like. Further, the CPU 55 has the function of, as the various types of information processing, executing the process of creating user data to be transmitted to the operator terminal apparatus 200, and transmitting the user data via the communication section 58, and the like. For example, the above functions are achieved by the CPU 55 executing a predetermined program. In the exemplary embodiment, the information processing apparatus 5 can communicate with the operator terminal apparatus 200 only via a particular access point AP. If the information processing apparatus 5 has become able to communicate with the particular access point AP using the communication section 58, the information processing apparatus 5 performs information processing by communicating with the operator terminal apparatus 200.

In addition, the CPU 55 has the function of, as the various types of information processing, performing processing based on a captured image captured by the image capturing section 50 and an operation of a user performed on the operation section 51, and the like. In the exemplary embodiment, if a predetermined marker image is included in a captured image captured by the image capturing section 50 (an outer camera 501), the CPU 55 performs a display control process for combining a virtual character with the captured image at a placement position based on the display position of the marker image, and displaying the combined image on the LCD 52.

The memory 56 stores various types of data for use when the CPU 55 performs the above processing. The memory 56 is, for example, a memory accessible by the CPU 55.

The program storage section 57 stores a program. The program storage section 57 may be any storage device (storage medium) accessible by the CPU 55. For example, the program storage section 57 may be a storage device provided in the information terminal apparatus 5 having the CPU 55, or may be a storage medium detachably attached to the information terminal apparatus 5 having the CPU 55. Alternatively, the program storage section 57 may be a storage device (a server or the like) connected to the CPU 55 via a network. The CPU 55 may load a part or all of the program into the memory 56 at appropriate timing and execute the loaded program.

The operation section 51 is an input apparatus that can be operated by the user. The operation section 51 may be any input apparatus. For example, the operation section 51 may be an input apparatus such as an operation button, a stick, or a touch panel, or may include an orientation sensor such as a gyro sensor or an acceleration sensor.

The LCD 52 is an example of a display section included in the information terminal apparatus 5 and displays an image in accordance with an instruction from the CPU 55. It should be noted that the LCD 52 may be a display apparatus capable of displaying a stereoscopically visible image by displaying a left-eye image and a right-eye image using substantially the same display area.

For example, the image capturing section 50 includes an outer camera 501, which is fixedly provided on the outer surface of a housing of the information processing apparatus 5 such that the image capturing direction of the outer camera 501 is the depth direction of a screen of the LCD 52. The image capturing section 50 also includes an inner camera 502, which is fixedly provided on the inner surface of the housing of the information processing apparatus 5 and capable of capturing the user of the information processing apparatus 5 such that the image capturing direction of the inner camera 502 is the direction toward the near side of the screen of the LCD 52. The outer camera 501 and the inner camera 502 are connected to the CPU 55, capture an image in accordance with an instruction from the CPU 55, and output the captured image data to the CPU 55. The outer camera 501 and the inner camera 502 include an imaging device (e.g., a CCD image sensor, a CMOS image sensor, or the like) having a predetermined resolution, and a lens. It should be noted that the lens may have a zoom mechanism. Further, the outer camera 501 and/or the inner camera 502 may form a stereo camera including two image capturing sections fixedly provided such that the image capturing directions of the image capturing sections are parallel in the left-right direction.

The sound output section 53 includes a loudspeaker for outputting a sound in accordance with an instruction from the CPU 55. The sound input section 54 includes a microphone for detecting a sound outside the information processing apparatus 5. A sound signal sensed by the sound input section 54 is converted into sound data in a predetermined format by a predetermined I/F circuit, and the sound data is output to the CPU 55.

The operator terminal apparatus 200 is composed of a stationary information processing apparatus such as a general personal computer. The operator terminal apparatus 200 transmits and receives communication packets via the network 100, thereby communicating with an apparatus (e.g., the information processing apparatus 5) connected to a particular access point AP. The operator terminal apparatus 200 can be operated by a user (an operator) of the operator terminal apparatus 200, and performs processing corresponding to user data transmitted from the information processing apparatus 5. For example, the operator terminal apparatus 200 performs the process of generating data for controlling a virtual character to be combined with a captured image and displayed on the LCD 52 of the information processing apparatus 5, and transmitting the generated data to the information processing apparatus 5 connected to the particular access point AP. Further, the operator terminal apparatus 200 performs the process of generating sound data for outputting a sound from the information processing apparatus 5, and transmitting the generated sound data. Further, the operator terminal apparatus 200 receives user data transmitted from the information processing apparatus 5 and acquires operation information of an operation of the user performed on the information processing apparatus 5 (e.g., captured image information of an image captured by the information processing apparatus 5, sound input information of a sound input to the information processing apparatus 5, operation information of an operation performed on the operation section 51 of the information processing apparatus 5, or the like). It should be noted that the operator terminal apparatus 200 may be composed of a single apparatus or a plurality of apparatuses. Further, in the operator terminal apparatus 200, the operation for controlling a virtual character is performed by the user (the operator). The operator terminal apparatus 200, however, only needs to acquire control data for controlling a virtual character. A system included in the operator terminal apparatus 200 may perform automatic control based on a predetermined algorithm or the like, thereby acquiring control data for controlling a virtual character.

Figure 2:
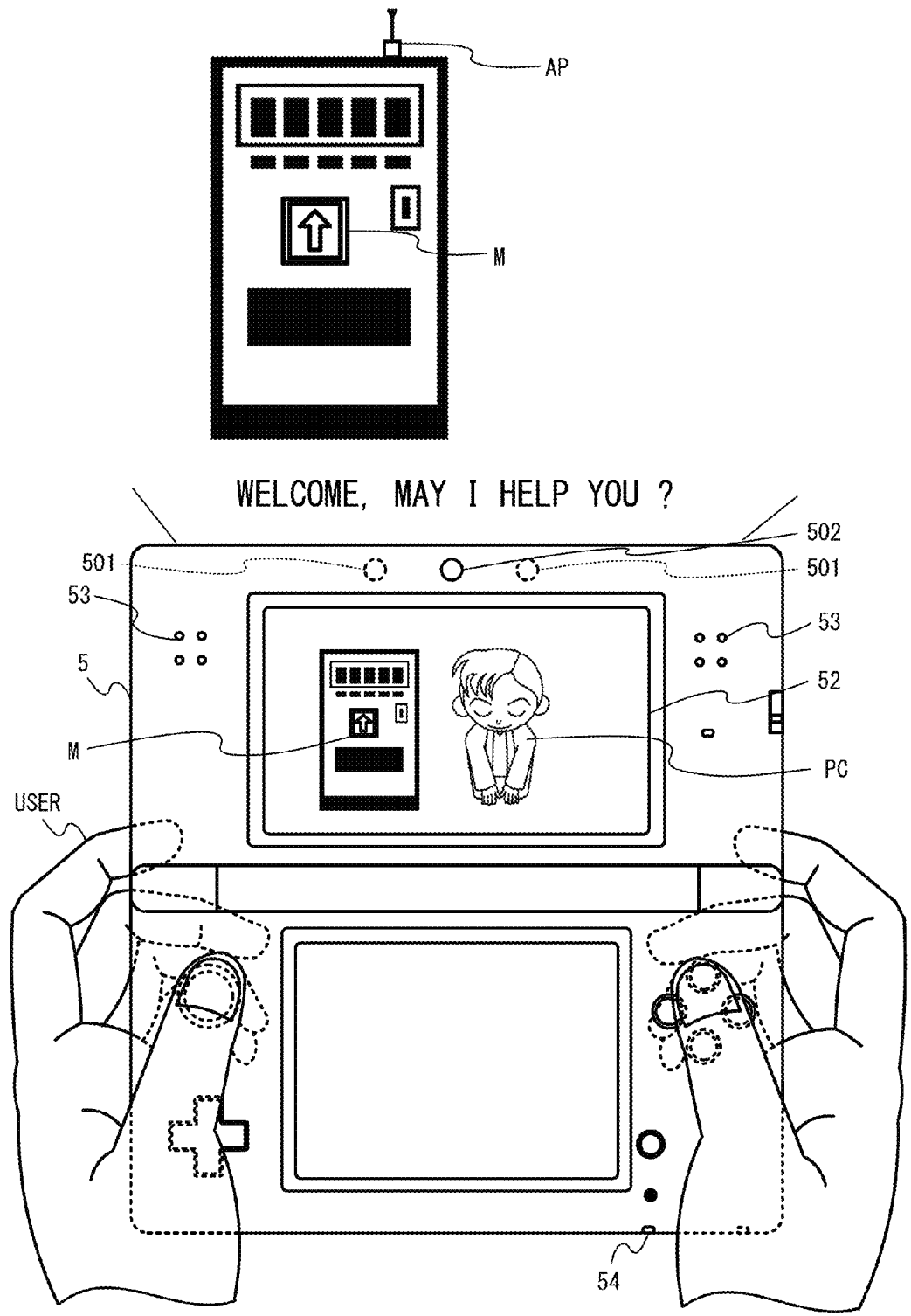
Figure 3:
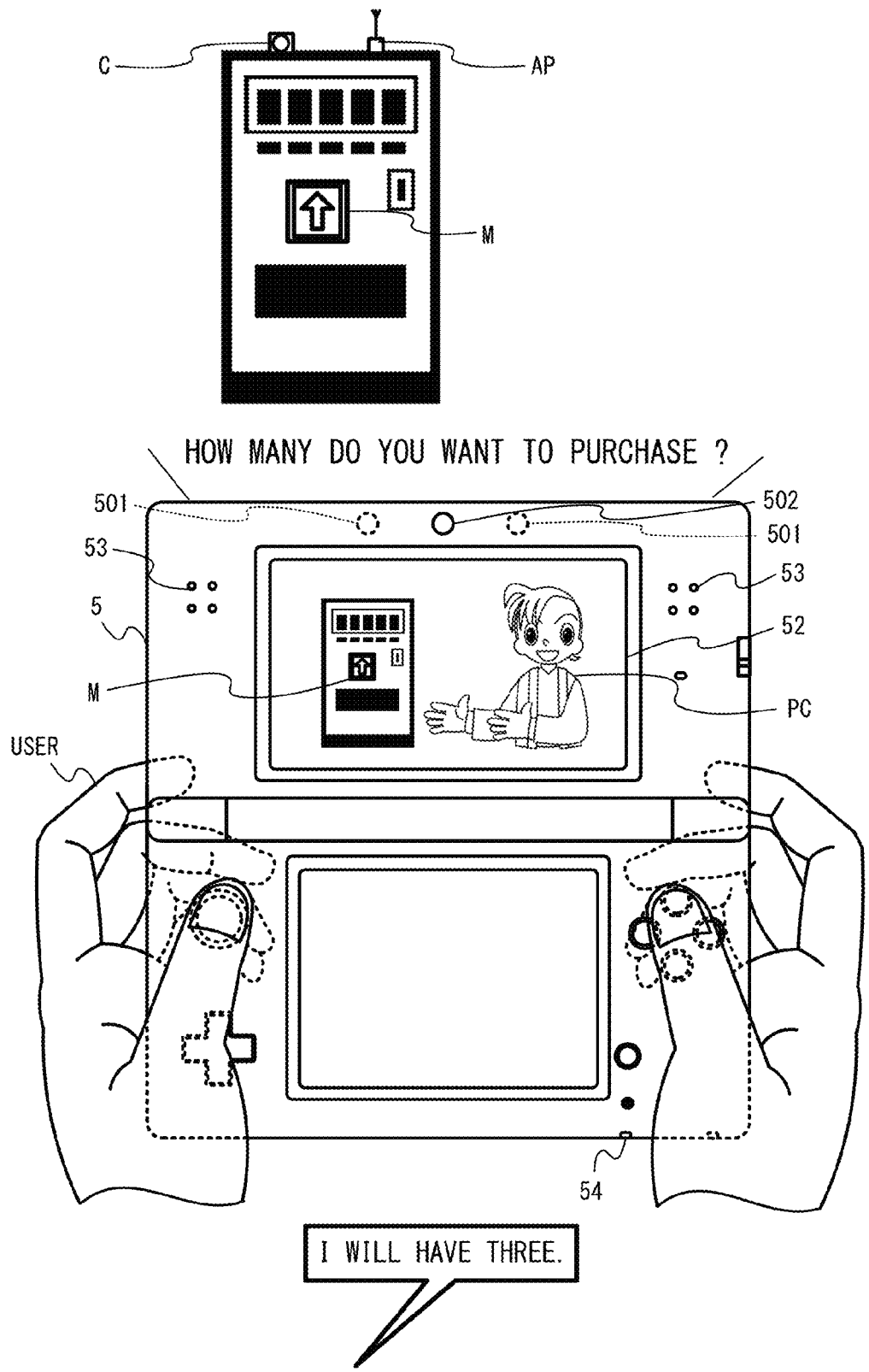
Figure 4:
FIG. 4 is a diagram showing a non-limiting example where an operator operates an operator terminal apparatus 200.

Next, with reference to FIGS. 2 to 4, a description is given of an example of an overview of the processing performed in the information processing system 1a, before the description of specific processing performed by the information processing apparatus 5. It should be noted that FIG. 2 is a diagram showing an example of a first stage, where a virtual character PC is displayed on the information processing apparatus 5 in the information processing system 1a. FIG. 3 is a diagram showing an example of a second stage, where the virtual character PC is displayed on the information processing apparatus 5 in the information processing system 1a. FIG. 4 is a diagram showing an example where the operator operates the operator terminal apparatus 200.

In FIG. 2, an access point AP is installed in an automated vending machine placed in the real world. Further, a marker M is placed near the vending machine. In the marker M, as an example, a predetermined figure or letter is drawn in a rectangular frame.

If the user of the information processing apparatus 5 has captured the real world using the image capturing section 50 (typically, the outer camera 501), the CPU 55 performs image processing such as pattern matching on a captured image acquired from the image capturing section 50, thereby determining whether or not the marker M is included in the captured image. Then, if the marker M has been captured by the image capturing section 50, a captured image in which the marker M is included as a subject is displayed as a real world image on the LCD 52, and a virtual character PC (e.g., a virtual character representing a clerk who sells products sold in the vending machine) is displayed on the LCD 52 in a combined manner at a position based on the display position of the marker image M included in the real world image.

It should be noted that directions (a front direction, a right direction, and an up direction) may be defined for the marker M, and the virtual character PC may be placed in an orientation based on the placement direction of the marker M and displayed in a combined manner. For example, the up direction of the virtual character PC may coincide with the up direction of the marker M, and the virtual character PC may be, in the orientation of facing the direction of the image capturing section 50 (i.e., the orientation in which the front of the virtual character PC is opposed to the user viewing the LCD 52), superimposed at the position of the marker M or placed at a position a predetermined distance away from the position of the marker M. Further, in accordance with the type of the marker M, the type of the virtual character PC to be displayed in a combined manner so as to correspond to the marker M may be changed.

Here, in the exemplary embodiment, the virtual character PC to be combined with a captured image is controlled based on data transmitted from the operator terminal apparatus 200 via the access point AP. The operator terminal apparatus 200 is connected to the particular access point AP via the network 100. Then, the access point AP has a communication range where the access point AP can communicate wirelessly with the information processing apparatus 5. If the information processing apparatus 5 has entered the communication range of the access point AP, the process of establishing the connection between the information processing apparatus 5 and the access point AP by wireless communication is performed automatically or in accordance with a user operation. Then, user data set in the information processing apparatus 5 is transmitted to the operator terminal apparatus 200 via the access point AP.

In response to this, the operator terminal apparatus 200 transmits, to the information processing apparatus 5 having established communication with the access point AP, data (character data) for controlling the type and the action of the virtual character PC and the like, data (sound data) for controlling a sound to be output from the sound output section 53, data (operation data) representing operation information of an operation performed on the operator terminal apparatus 200, and the like. For example, in the example of FIG. 2, in accordance with data transmitted from the operator terminal apparatus 200, the virtual character PC representing a bowing clerk is being displayed on the LCD 52, and the sound "Welcome, may I help you?" is being output from the sound output section 53. In such a case, the operator terminal apparatus 200 is transmitting, to the information processing apparatus 5, character data for performing control so that the virtual character representing a clerk bows, as the type and the action of the virtual character PC, and sound data for outputting the sound "Welcome, may I help you?" from the sound output section 53. In response to this, data representing an image of the user captured by the inner camera 502 of the information processing apparatus 5 (e.g., a moving image obtained by capturing the face of the user) is transmitted as user data to the operator terminal apparatus 200.

In addition, in the example of FIG. 3, in accordance with data transmitted from the operator terminal apparatus 200, the virtual character PC representing a clerk taking the action of prompting a purchase is being displayed on the LCD 52, and the sound "How many do you want to purchase?" is being output from the sound output section 53. In such a case, the operator terminal apparatus 200 is transmitting, to the information processing apparatus 5, character data for performing control so that the virtual character representing a clerk prompts a purchase, as the type and the action of the virtual character PC, and sound data for outputting the sound "How many do you want to purchase?" from the sound output section 53. In response to this, the user of the information processing apparatus 5 themselves is uttering, "I will have three". A sound thus uttered by the user is detected by the sound input section 54 of the information processing apparatus 5, and sound data representing the uttered sound is transmitted as user data to the operator terminal apparatus 200. Further, data representing an image of the user captured by the inner camera 502 of the information processing apparatus 5 (e.g., a moving image obtained by capturing the face of the user uttering, "I will have three.") is transmitted as user data to the operator terminal apparatus 200.

On the other hand, as shown in FIG. 4, the operator of the operator terminal apparatus 200 can move forward the conversation with the user of the information processing apparatus 5 having established a connection with the particular access point AP. As described above, user data is transmitted from the information processing apparatus 5 via the access point AP, and the operator terminal apparatus 200 receives the user data, thereby acquiring a user image and a user sound. Then, the operator of the operator terminal apparatus 200 displays the user image on a monitor and listens to the user sound, thereby exchanging information with the user of the information processing apparatus 5.

For example, in the situation shown in FIG. 2, the operator of the operator terminal apparatus 200 knows from user data transmitted from the information processing apparatus 5 that the information processing apparatus 5 has established a connection with the particular access point AP. Then, the operator of the operator terminal apparatus 200 themselves utters, "Welcome, may I help you?" to a sound input section of the operator terminal apparatus 200, thereby transmitting data representing the uttered sound to the information processing apparatus 5. Further, the operator terminal apparatus 200 sets the type of the virtual character PC corresponding to the access point AP to which the information processing apparatus 5 has connected. Further, the operator terminal apparatus 200 recognizes by speech recognition the sound uttered by the operator, thereby setting the action of the virtual character PC suitable for the sound. For example, in accordance with the recognition of the sound "Welcome, may I help you?" by speech recognition, the operator terminal apparatus 200 sets a bowing action as the action of the virtual character PC. Then, the operator terminal apparatus 200 transmits data representing the set type and action of the virtual character PC to the information processing apparatus 5.

In addition, in the situation shown in FIG. 3, the operator of the operator terminal apparatus 200 themselves utters, "How many do you want to purchase?" to the sound input section of the operator terminal apparatus 200, thereby transmitting data representing the uttered sound to the information processing apparatus 5. Further, in accordance with the recognition, by speech recognition, of the sound "How many do you want to purchase?" uttered by the operator, the operator terminal apparatus 200 sets the action of prompting a purchase as the action of the virtual character PC. Then, the operator terminal apparatus 200 transmits data representing the set action of the virtual character PC to the information processing apparatus 5. Further, the operator of the operator terminal apparatus 200 can know from user data (captured image data and sound data) transmitted from the information processing apparatus 5 that the user of the information processing apparatus 5 has uttered, "I will have three."

It should be noted that the action of the virtual character PC may be set by a method other than speech recognition in the operator terminal apparatus 200. For example, the operator may operate an input apparatus (e.g., a keyboard or a mouse) of the operator terminal apparatus 200 to select one action from among a plurality of options for actions, thereby setting the action of the virtual character PC. Alternatively, the virtual character PC may be displayed on the monitor of the operator terminal apparatus 200, and in accordance with an operation performed on an input apparatus, the virtual character PC may be caused to take action, thereby setting the action of the virtual character PC. Further, the operator terminal apparatus 200 may recognize text data input by the operator, thereby setting the action of the virtual character PC.

In addition, the action of the virtual character PC may be set on the information processing apparatus 5 side. For example, if sound data representing the sound of the operator has been acquired from the operator terminal apparatus 200, the information processing apparatus 5 may recognize the sound by speech recognition, thereby setting the action of the virtual character PC. Further, if operation data for selecting the action of the virtual character PC or operation data for causing the virtual character PC to take action has been acquired from the operator terminal apparatus 200, the information processing apparatus 5 may set the action of the virtual character PC in accordance with the acquired operation data.

In addition, image data of the virtual character PC may be appropriately transmitted from the operator terminal apparatus 200 in accordance with the fact that the information processing apparatus 5 has connected to the access point AP, or may be stored in advance in the information processing apparatus 5. In the first case, every time the type and/or the action of the virtual character PC are set on the operator terminal apparatus 200 side, image data of the virtual character PC corresponding to the set type and/or action is transmitted from the operator terminal apparatus 200 to the information processing apparatus 5. In the second case, every time the type and/or the action of the virtual character PC are set on the operator terminal apparatus 200 side or the information processing apparatus 5 side, corresponding image data is extracted from the image data of the virtual character PC stored in advance in the information processing apparatus 5.

In addition, the virtual character PC, which appears by detecting the marker M from a captured image, may be, as an example, displayed on the LCD 52 only if character data from the operator terminal apparatus 200 has been received. Further, as another example, only if character data from the operator terminal apparatus 200 has been received, a special character may be displayed as the virtual character PC on the LCD 52. In the first case, the virtual character PC is not displayed only by capturing the marker M. Thus, to display the virtual character PC, the user needs to enter the communication range of an access point AP where the marker M is installed. Also in the second case, the special character is not displayed as the virtual character PC only by capturing the marker M. Thus, to display the special character, the user needs to enter the communication range of an access point AP where the marker M is installed. Thus, in either case, a particular access point AP and the information processing apparatus 5 need to establish communication with each other. This effectively motivates the user to visit a particular place (the installation location of the particular access point AP).

Figure 5:
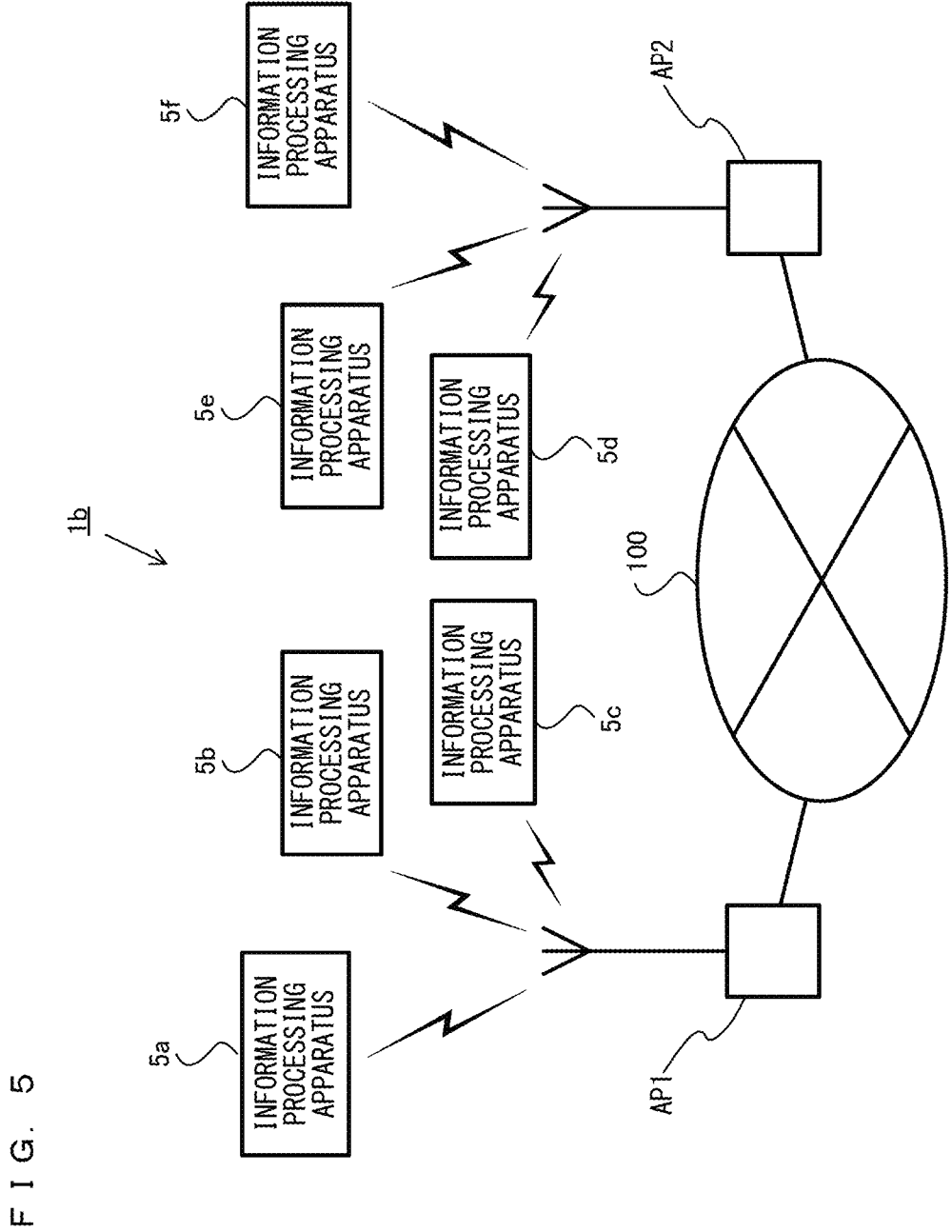
FIG. 5 is a block diagram showing a non-limiting example of an information processing system 1b, which includes a plurality of information processing apparatuses 5a to 5f.
Figure 6:
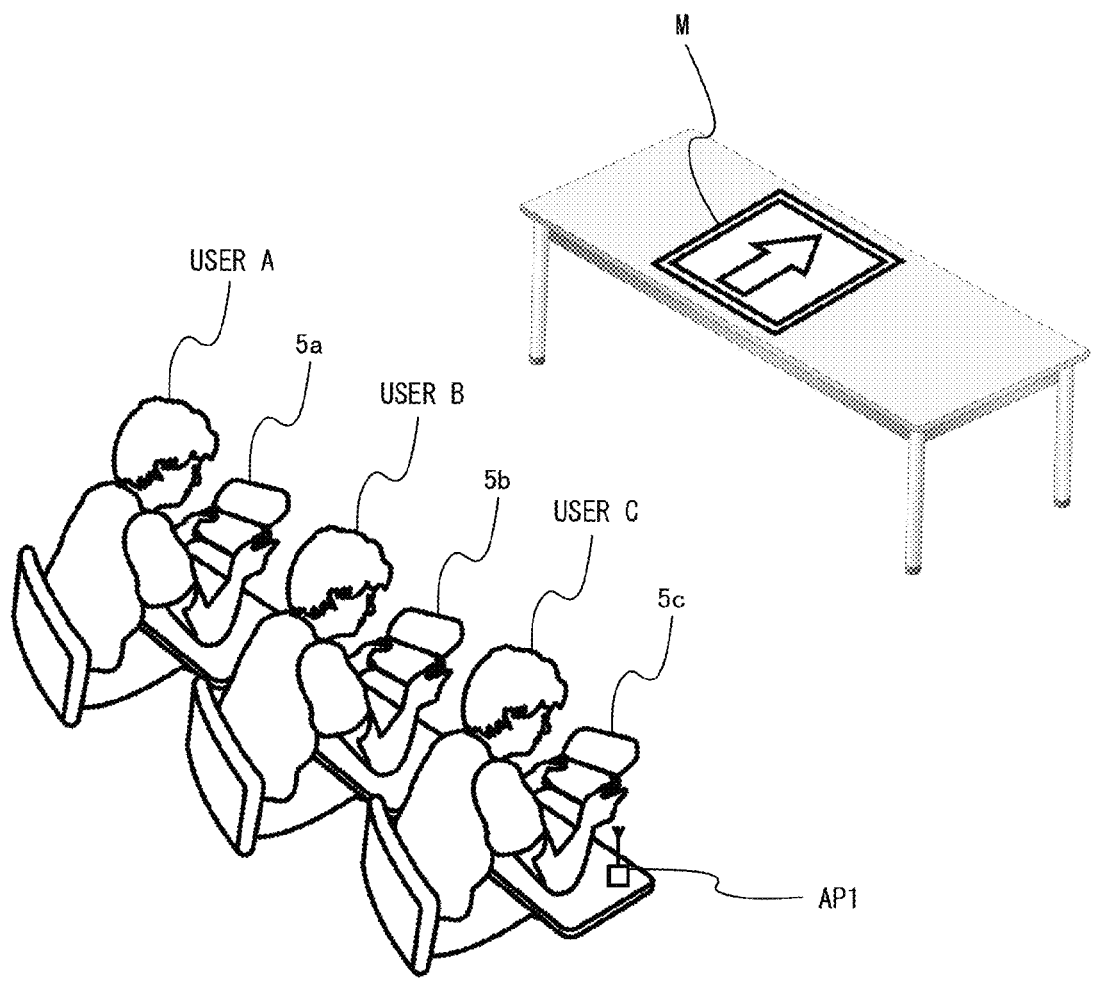
FIG. 6 is a diagram showing a non-limiting example of the state where the plurality of information processing apparatuses 5a to 5c are operated by connecting to an access point AP1 and in the information processing system 1b.
Figure 7:
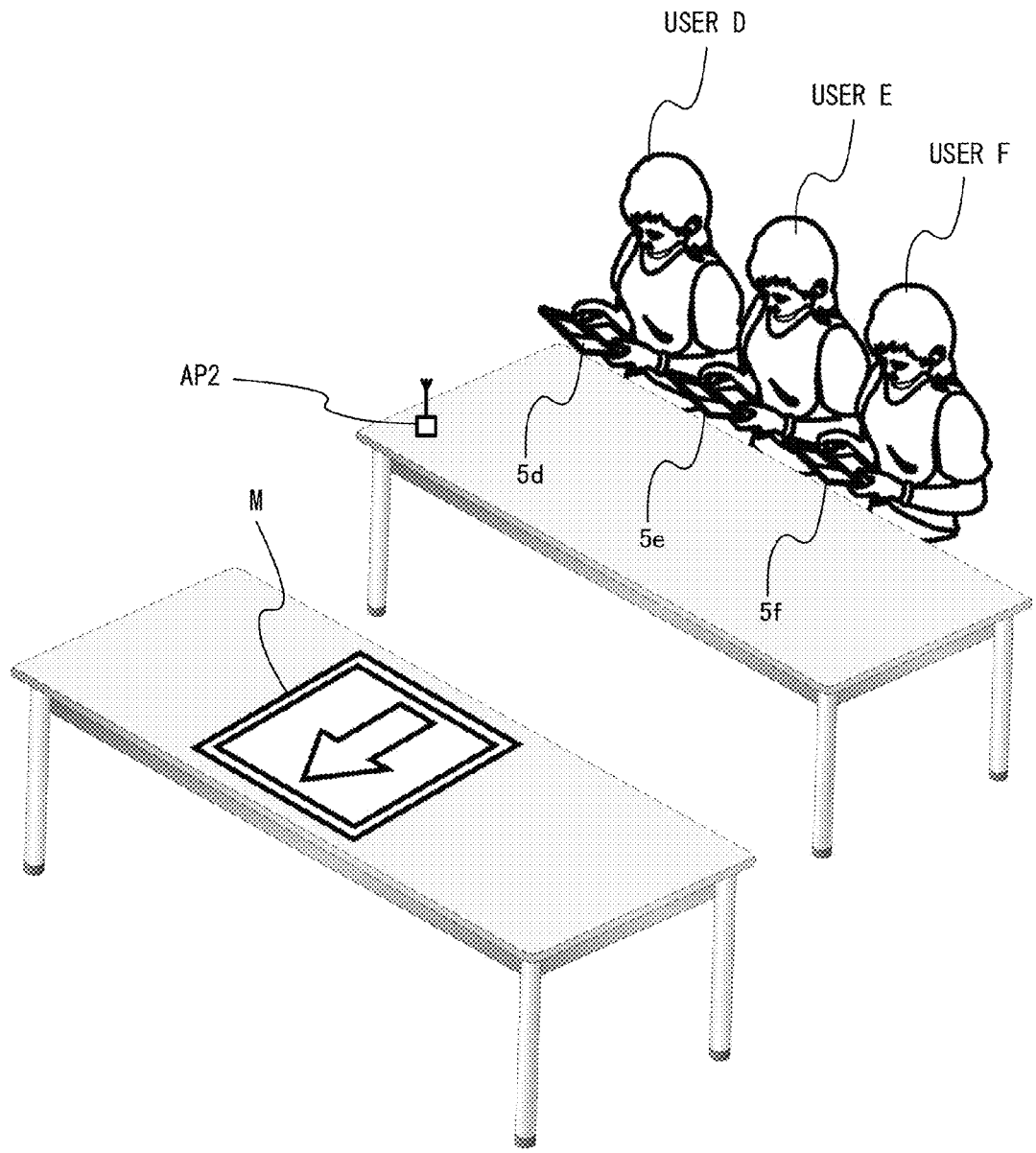
FIG. 7 is a diagram showing a non-limiting example of the state where the plurality of information processing apparatuses 5d to 5f are operated by connecting to an access point AP2 in the information processing system 1b.
Figure 8:
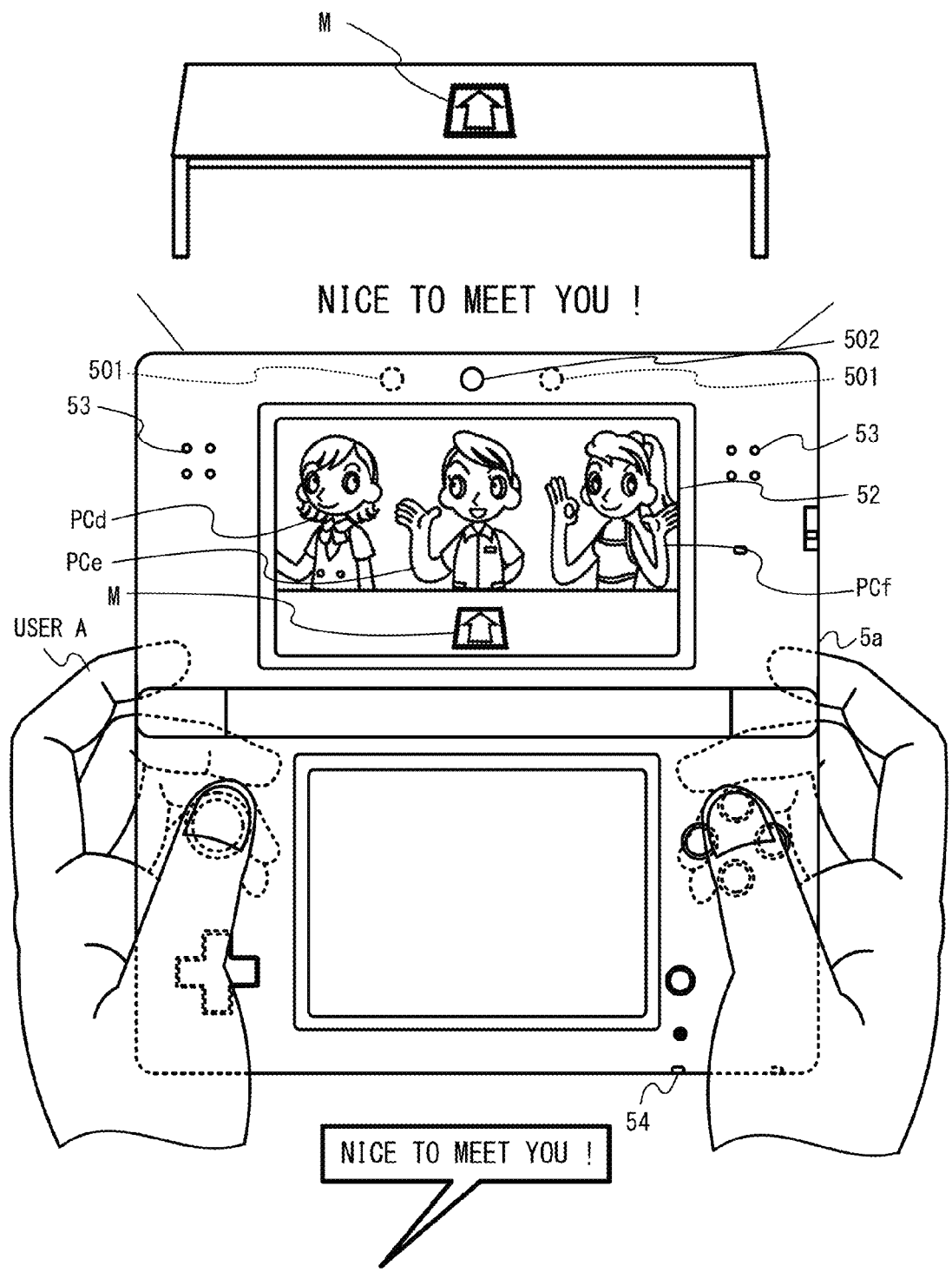

Next, with reference to FIGS. 5 to 8, a description is given of another example of the information processing system including an information processing apparatus for executing an information processing program according to the exemplary embodiment. It should be noted that FIG. 5 is a block diagram showing an example of an information processing system 1*b*, which includes a plurality of information processing apparatuses 5*a* to 5*f*. FIG. 6 is a diagram showing an example of the state where the plurality of information processing apparatuses 5*a* to 5*c* are operated by connecting to an access point AP1 in the information processing system 1*b*. FIG. 7 is a diagram showing an example of the state where the plurality of information processing apparatuses 5*d* to 5*f* are operated by connecting to an access point AP2 in the information processing system 1*b*. FIG. 8 is a diagram showing an example where virtual characters PCd to PCf are displayed on the information processing apparatus 5*a*.

As shown in FIG. 5, in the information processing system 1*b*, a plurality of information processing apparatuses 5*a* to 5*c* are placed remotely from a plurality of information processing apparatuses 5d to 5f. The information processing system 1b is constructed by the connection between both groups of information processing apparatuses via an access point AP1, an access point AP2, and a network 100. For example, each of the information processing apparatuses 5a to 5c is configured to connect to the network 100 via the access point AP1 using wireless communication. Further, each of the information processing apparatuses 5d to 5f is configured to connect to the network 100 via the access point AP2 using the wireless communication. Then, the information processing apparatuses 5a to 5c and the information processing apparatuses 5d to 5f establish connections with the others via the network 100 and thereby can communicate wirelessly with the others. It should be noted that the configuration of each of the information processing apparatuses 5a to 5f is similar to that of the above information processing apparatus 5, and therefore is not described in detail here.

In FIG. 6, a particular access point AP1 is installed in a room in the real world. Further, in the room where the access point AP1 is installed, a table is installed on which a marker M is placed. In the marker M, as an example, a predetermined figure or letter is drawn in a rectangular frame. Then, a user A, who operates the information processing apparatus 5a, a user B, who operates the information processing apparatus 5b, and a user C, who operates the information processing apparatus 5c, are visiting the room where the access point AP1 is installed.

In FIG. 7, a particular access point AP2 is installed in a room different from the room where the access point AP1 is installed (e.g., a room remote from or adjacent to the room where the access point AP1 is installed). Further, also in the room where the access point AP2 is installed, a table is installed on which a marker M is placed. Then, a user D, who operates the information processing apparatus 5d, a user E, who operates the information processing apparatus 5e, and a user F, who operates the information processing apparatus 5f, are visiting the room where the access point AP2 is installed.

If each of the users A to F of the information processing apparatuses 5a to 5f has captured the real world using the image capturing section 50 (typically, the outer camera 501), the CPU 55 performs image processing such as pattern matching on a captured image acquired from the image capturing section 50, thereby determining whether or not the marker M is included in the captured image. Then, if the marker M has been captured by the image capturing section 50, the captured image in which the marker M is included as a subject is displayed as a real world image on the LCD 52, and a virtual character PC is displayed on the LCD 52 in a combined manner at a position based on the display position of the marker image M included in the real world image.

For example, as shown in FIG. 8, if the user A of the information processing apparatus 5a has captured the real world including the marker M on the table, using the outer camera 501, virtual characters PCd to PCf are displayed side by side on the LCD 52 in a combined manner at positions based on the display position of the marker image M included in the real world image (e.g., across the table on which the marker M is placed).

In the exemplary embodiment, each virtual character PC to be combined with a captured image is controlled based on data transmitted from another information processing apparatus 5 via the access points AP1 and AP2. Here, each of the access points AP1 and AP2 has a communication range where the access point can communicate wirelessly with each information processing apparatus 5. If each information processing apparatus 5 has entered the communication range of the access point AP1 or the communication range of the access point AP2, the process of establishing the connection between the information processing apparatus 5 and the access point AP1 or AP2 by wireless communication is performed automatically or in accordance with a user operation. Then, user data set in the information processing apparatus 5 connected to the particular access point AP1 is transmitted to the information processing apparatus 5 connected to the particular access point AP2. Further, user data set in the information processing apparatus 5 connected to the particular access point AP2 is transmitted to the information processing apparatus 5 connected to the particular access point AP1. That is, in the examples shown in FIGS. 5 to 7, user data set in each of the information processing apparatuses 5a to 5c connected to the particular access point AP1 is transmitted to the information processing apparatuses 5d to 5f connected to the particular access point AP2, and user data set in each of the information processing apparatuses 5d to 5f is transmitted to the information processing apparatuses 5a to 5c.

Each information processing apparatus 5 transmits, to another information processing apparatus 5 that is the transmission destination, data (character data) for controlling the type and the action of the virtual character PC and the like, data (sound data) for controlling a sound to be output from the sound output section 53 of the information processing apparatus 5 that is the transmission destination, data (operation data) representing operation information of an operation performed on the information processing apparatus 5 that is the transmission source. For example, in the example of FIG. 8, in accordance with data transmitted from the information processing apparatuses 5d to 5f, the virtual characters PCd to PCf representing the users D to F of the information processing apparatuses 5d to 5f, respectively, are displayed on the LCD 52 of the information processing apparatus 5a, and the sounds "Nice to meet you!" from all the users D to F are being output from the sound output section 53 of the information processing apparatus 5a. In such a case, the information processing apparatus 5d is transmitting, to each of the information processing apparatuses 5a to 5c, character data for performing control so that a virtual character set as a character of the user D themselves is seated on the left across the table, as the type and the action of the virtual character PCd, and sound data for outputting the sound "Nice to meet you!" from the sound output section 53. Further, the information processing apparatus 5e is transmitting, to each of the information processing apparatuses 5a to 5c, character data for performing control so that a virtual character set as a character of the user E themselves is seated in the middle across the table, as the type and the action of the virtual character PCe, and sound data for outputting the sound "Nice to meet you!" from the sound output section 53. Further, also the information processing apparatus 5f is transmitting, to each of the information processing apparatuses 5a to 5c, character data for performing control so that a virtual character set as a character of the user F themselves is seated on the right across the table, as the type and the action of the virtual character PCf, and sound data for outputting the sound "Nice to meet you!" from the sound output section 53. In response to this, the user A of the information processing apparatus 5a themselves is uttering, "Nice to meet you!" A sound thus uttered by the user A is detected by the sound input section 54 of the information processing apparatus 5a, and sound data representing the uttered sound is transmitted as user data to the information processing apparatuses 5d to 5f.

Further, user data representing the type and the action of a virtual character PCa of the information processing apparatus 5a (e.g., character data for performing control so that the virtual character PCa set as a character of the user A themselves is seated on the right across the table) is transmitted to the information processing apparatuses 5d to 5f.

As described above, each of the information processing apparatuses 5a to 5c connected to the access point AP1 receives user data from each of the information processing apparatuses 5d to 5f connected to the access point AP2, whereby on the LCD 52, an image is displayed in which the virtual characters PCd to PCf set as characters of the users D to F themselves of the information processing apparatuses 5d to 5f, respectively, are seated across the table. Further, user data is received from the information processing apparatuses 5d to 5f, whereby sounds uttered by the users D to F of the information processing apparatuses 5d to 5f, respectively, are output from the sound output section 53 of each of the information processing apparatuses 5a to 5c. On the other hand, each of the information processing apparatuses 5d to 5f receives user data from each of the information processing apparatuses 5a to 5c, whereby on the LCD 52, an image is displayed in which the virtual characters PCa to PCc set as characters of the users A to C themselves of the information processing apparatuses 5a to 5c, respectively, are seated across the table. Further, sounds uttered by the users A to C are output from the sound output section 53 of each of the information processing apparatuses 5d to 5f. Thus, a user visits the particular access point AP1 or AP2 while having an information processing apparatus 5 with the user, and thereby can enjoy the experience as if another user operating an information processing apparatus 5 in a separate room were in the same room. This makes it possible to hold a virtual meeting where a plurality of users gather. Further, an access point that allows such an event is narrowed down to the particular access points AP1 and AP2. This effectively motivates a user to visit a particular place (the installation locations of the particular access point AP1 or AP2).

It should be noted that the action of each virtual character PC may be set by, in the information processing apparatus 5 which is the transmission source and in which the virtual character PC is set, recognizing by speech recognition a sound input to the sound input section 54 of the information processing apparatus 5. For example, in each of the information processing apparatuses 5a to 5f that are the transmission sources, in accordance with the fact that the sound "Nice to meet you!" uttered by the corresponding one of the users A to F is recognized by speech recognition, a greeting action is set as the action of the corresponding one of the virtual characters PCa to PCf. Then, each of the information processing apparatuses 5a to 5f that are the transmission sources transmits, to the information processing apparatuses 5 that are the transmission destinations, data representing the set action of the corresponding one of the virtual characters PCa to PCf.

In addition, the action of each virtual character PC may be set by a method other than speech recognition. For example, each of the users A to F may operate an input apparatus (e.g., a touch panel or an operation button) of the corresponding one of the information processing apparatuses 5a to 5f to select one action from among a plurality of options of actions, thereby setting the action of the corresponding one of the virtual characters PCa to PCf. Alternatively, each of the virtual characters PCa to PCf set as characters of the respective users themselves may be displayed on the LCD 52 of the corresponding one of the information processing apparatuses 5a to 5f, and in accordance with an operation performed on an input apparatus, the corresponding one of the virtual characters PCa to PCf may be caused to take action, thereby setting the action of the corresponding one of the virtual characters PCa to PCf.

In addition, the action of each virtual character PC may be set in an information processing apparatus 5 that is the transmission destination. For example, if sound data representing the sound of a user has been acquired from an information processing apparatus 5 that is the transmission source, an information processing apparatus 5 that is the transmission destination may recognize the sound by speech recognition, thereby setting the action of the virtual character PC of the transmission source. Further, if operation data for selecting the action of a virtual character PC or operation data for causing a virtual character PC to take action has been acquired from an information processing apparatus 5 that is the transmission source, an information processing apparatus 5 that is the transmission destination may set the action of the virtual character PC of the transmission source in accordance with the acquired operation data.

In addition, if a plurality of virtual characters PC are placed for a single marker M, the placement positions of the plurality of virtual characters PC may be set by setting a positional relationship in accordance with a predetermined condition, or may be set based on the positional relationship between information processing apparatuses 5 that are the transmission sources. As a first example, a plurality of positions where virtual characters PC can be placed are set in advance, and placement positions are sequentially assigned to the virtual characters PC in accordance with a predetermined order (e.g., the order of connecting to an access point, or the order of registering participation in an event), thereby setting the position where each virtual character PC is combined with a real world image. As a second example, the positional relationship between each of information processing apparatuses 5 that are the transmission sources and the marker M captured by the information processing apparatus 5 is calculated, thereby, based on the calculated positional relationship, setting the position where each virtual character PC is combined with a real world image. For example, as exemplified in FIG. 6, if the image capturing section 50 of each of the information processing apparatuses 5a to 5c has captured the same marker M, an image of the marker M is detected from a captured image captured by the image capturing section 50, whereby it is possible to calculate the positional relationship between the marker M (the subject) in the real world and the image capturing section 50 (the camera) of each of the information processing apparatuses 5a to 5c. Then, the virtual characters PCa to PCc are placed based on such a positional relationship and combined with a real world image to be displayed on the information processing apparatuses 5d to 5f that are the transmission destinations.

In addition, image data of each virtual character PC may be appropriately transmitted from an information processing apparatus 5 that is the transmission source to an information processing apparatus 5 that is the transmission destination, or may be stored in advance in each information processing apparatus 5. In the first case, every time the action of the virtual character PC is set in the information processing apparatus 5 that is the transmission source, image data of the virtual character PC corresponding to the set action is transmitted from the information processing apparatus 5 that is the transmission source to the information processing apparatus 5 that is the transmission destination. In the second case, every time the type and/or the action of the virtual character PC are set, then based on this setting information, corresponding image data is extracted from the image data of the virtual character PC stored in advance in the information processing apparatus that is the transmission destination. As an example, if parts of each virtual character PC are stored in advance in each information processing apparatus 5 and when the type and/or the action of the virtual character PC are set, selection information of each part and information indicating the position, the direction, and the size of the part are set. Then, in the information processing apparatus 5 that is the transmission destination, the parts of the virtual character PC stored in advance are placed based on the above information, thereby generating image data of the virtual character PC based on the above information.

In addition, as image data of each virtual character PC, an image of the user for whom the virtual character PC is set may be used. For example, an image of the face of the user for whom the virtual character PC is set may be pasted on the head of the virtual character PC, thereby generating image data of the virtual character PC. In this case, from an information processing apparatus 5 that is the transmission source, data representing an image of the user of the information processing apparatus 5 captured by the inner camera 502 (e.g., a moving image obtained by capturing the face of the user) is transmitted as user data to an information processing apparatus 5 that is the transmission destination. Then, in the information processing apparatus 5 that is the transmission destination, the image of the user is pasted on the head of the virtual character PC representing the user of the information processing apparatus 5 that is the transmission source, and the resulting image is displayed on the LCD 52. As described above, a virtual character PC is generated using a real photograph of each user, whereby it is possible to enjoy the experience as if another user operating an information processing apparatus 5 in a separate room were in the same room in a more realistic manner.

In addition, in the above information processing systems 1a and 1b, the marker M is placed in the real world to place each virtual character PC in a real world image and combine the virtual character PC with the real world image. Alternatively, the marker M may not be provided. As a first example, if the marker M is not installed, a reference for placing the virtual character PC in a real world image may be provided. For example, a predetermined shape or a predetermined object in the real world (e.g., the upper surface of a rectangular table) may be used as the reference. In this case, the predetermined shape or the predetermined object is detected from a captured image by performing image processing such as pattern matching. Then, it is possible, based on the detected reference, to place the virtual character PC in a real world image. As a second example, if the information processing apparatus 5 has a GPS (Global Positioning System) function, so-called location-based AR may be used, in which the virtual character PC is placed in a real world image using position information acquired from the GPS and additional information (e.g., information indicating the azimuth orientation of the information processing apparatus 5 detected by a magnetic sensor, or information indicating the orientation and the action of the main body of the information processing apparatus 5 detected by an acceleration sensor or a gyro sensor). As a third example, if the information processing apparatus 5 has the function of detecting the radio field intensity of an access point when communicating wirelessly with the access point, a virtual character PC may be placed in a real world image using as the above position information an access position calculated based on the radio field intensity of each access point detected by this function and the installation position of the access point.

In addition, in the above exemplary embodiment, the type and the action of each virtual character PC are set in accordance with a user input (a sound input, an operation input, or the like) to another apparatus. Alternatively, another display form may be set. For example, in accordance with a user input to another apparatus, the size, the color, the density, and the brightness of a virtual character PC, the number of virtual characters PC, and the like may be set, or a movement parameter (e.g., the moving velocity or the moving direction) of a virtual character PC may be set. Further, an image to be displayed in a combined manner in a real world image does not need to be a virtual character PC. For example, the display forms of virtual objects including an object, a landform, and the like may be set in accordance with a user input to another apparatus, and the virtual objects may be displayed in a combined manner in a real world image based on the set display forms.

In addition, in the above exemplary embodiment, between the information processing apparatus 5 and the operator terminal apparatus 200, or between information processing apparatuses 5, data representing a sound uttered by each user is transmitted and received bidirectionally. Alternatively, the sound may be converted into text data, and then transmitted and received bidirectionally. In this case, a text image corresponding to the text data (e.g., a balloon of a virtual character PC) may be displayed on the display screen of the receiving-end apparatus. Further, if the text data is transmitted and received bidirectionally, text data generated by inputting text in either apparatus may be transmitted and received.

In addition, in the above information processing systems 1a and 1b, the process of combining an image of each virtual character PC with a real world image (a captured image) is performed by an information processing apparatus 5 that is the transmission destination (i.e., an apparatus for controlling the display of the combined image). Alternatively, an apparatus controlling the virtual character PC may perform this process. For example, an information processing apparatus 5 that is the transmission destination transmits a captured image captured by the apparatus to an apparatus controlling the virtual character PC (the operator terminal apparatus 200 or another information processing apparatus 5). Then, the apparatus controlling the virtual character PC performs a combination process for displaying the virtual character PC in the transmitted captured image and transmits an image subjected to the combination process to the information processing apparatus 5 having transmitted the captured image.

In addition, in the above exemplary embodiment, a particular access point is set, thereby setting the range where the particular access point can communicate, as a particular place to which a user is to be led. Alternatively, the particular place may be set by another method. As an example, if the information processing apparatus 5 has a GPS function, it may be determined, based on the position on earth calculated by the GPS function, whether or not the information processing apparatus 5 is accessing an access point from a particular place. As another example, if the information processing apparatus 5 has the function of detecting the radio field intensity of an access point when communicating wirelessly with the access point, it may be determined, based on an access position calculated based on the radio field intensity of each access point detected by this function and the installation position of the access point, whether or not the information processing apparatus 5 is accessing an access point from a particular place.

Next, the details of the processing performed by the information processing apparatus 5 are described. First, with reference to FIG. 9, main data used in the processing is described. It should be noted that FIG. 9 is a diagram showing examples of the main data and programs stored in the memory 56 of the information processing apparatus 5.

Figure 9:
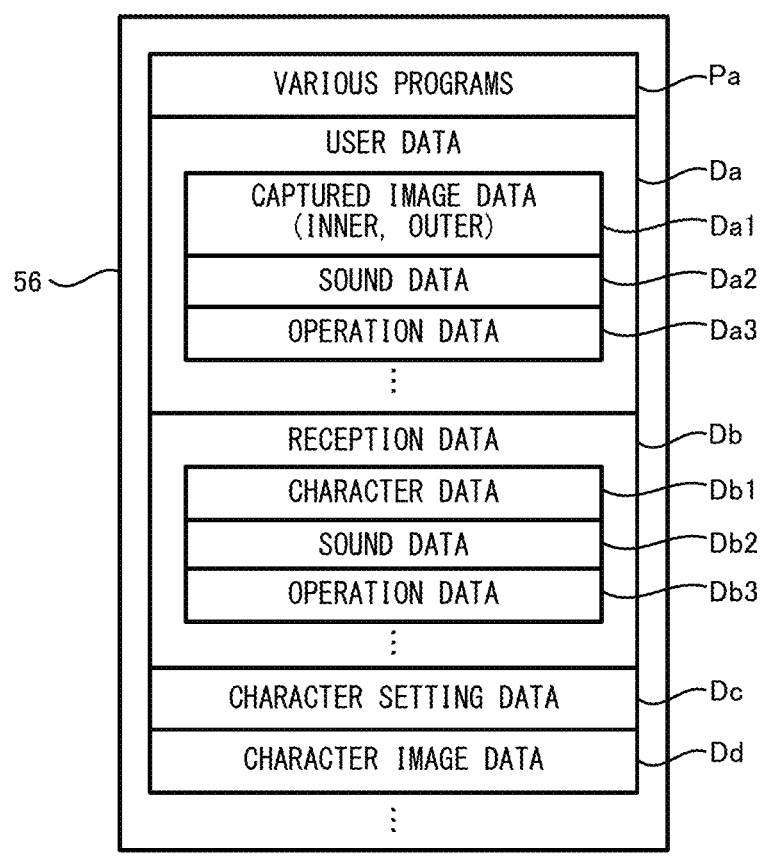
FIG. 9 is a diagram showing non-limiting examples of main data and programs stored in a memory 56 of the information processing apparatus 5.

As shown in FIG. 9, the following are stored in the data storage area of the memory 56: user data Da; reception data Db; character setting data Dc; character image data Dd; and the like. It should be noted that the memory 56 may store, as well as the data shown in FIG. 9, data necessary for the processing, such as data used in an application to be executed. Further, in the program storage area of the memory 56, various programs Pa included in the information processing program are stored.

The user data Da is data set in accordance with a user operation on the information processing apparatus 5 and includes captured image data Da1, sound data Da2, operation data Da3, and the like. The captured image data Da1 is data representing a captured image captured in real time by the image capturing section 50 (the outer camera 501 and the inner camera 502) and is sequentially updated every time an image is captured. The sound data Da2 is data representing a sound detected by the sound input section 54. The operation data Da3 is data representing the content of the operation performed on the operation section 51.

The reception data Db is data received from another apparatus (the operator terminal apparatus 200 or another information processing apparatus 5) and includes character data Db1, sound data Db2, operation data Db3, and the like. The character data Db1 is data used to set the type and the action of a virtual character PC. The sound data Db2 is data representing a sound input to another apparatus. The operation data Db3 is data representing the content of the operation input using another apparatus.

The character setting data Dc is data representing the type and the action of a virtual character PC to be displayed on the LCD 52. The character image data Dd is data for generating an image of a virtual character PC and displaying the generated image on the LCD 52.

Figure 10:
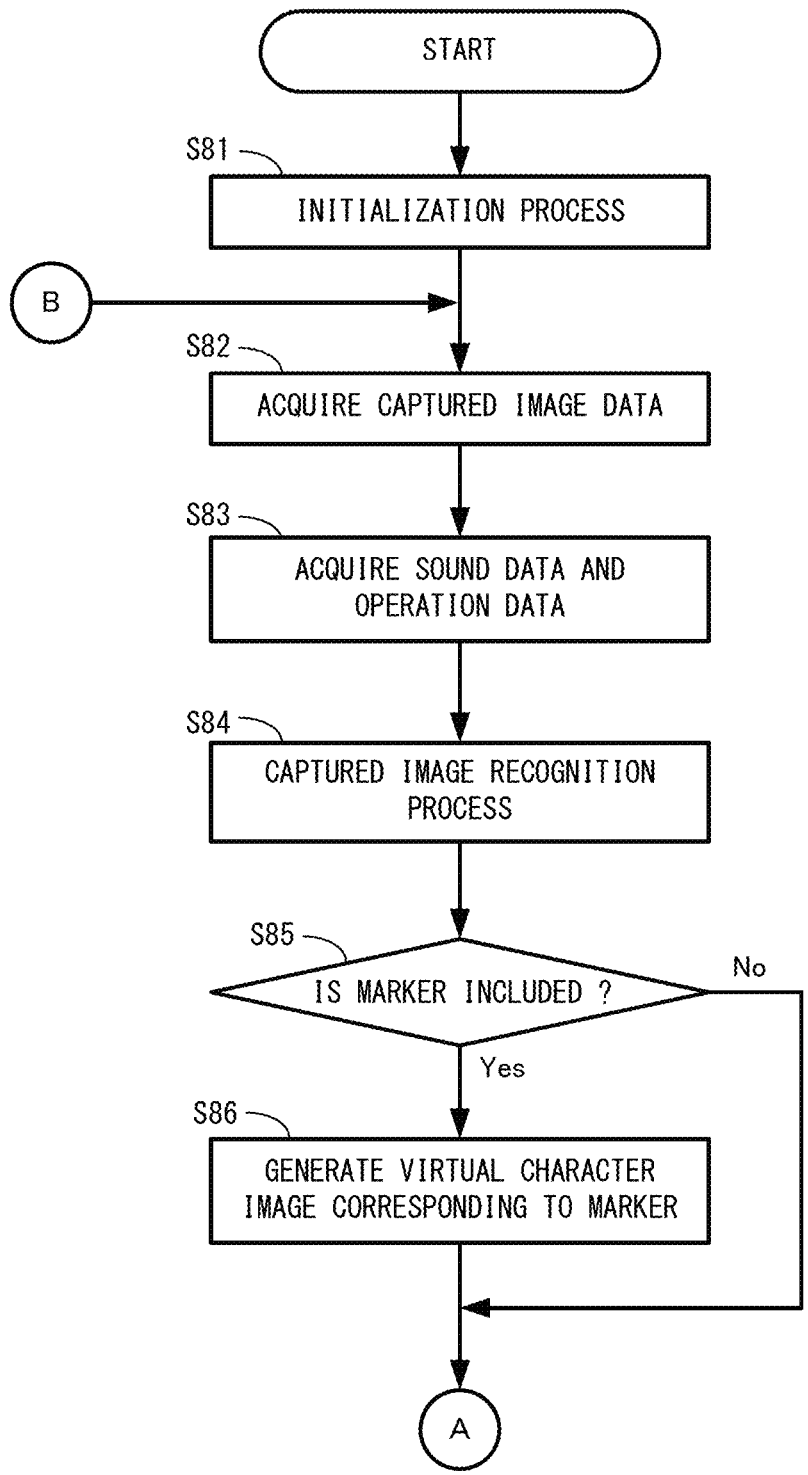
FIG. 10 is a flow chart showing a non-limiting example of the first half of information processing performed by the information processing apparatus 5 (a CPU 55)
Figure 11:
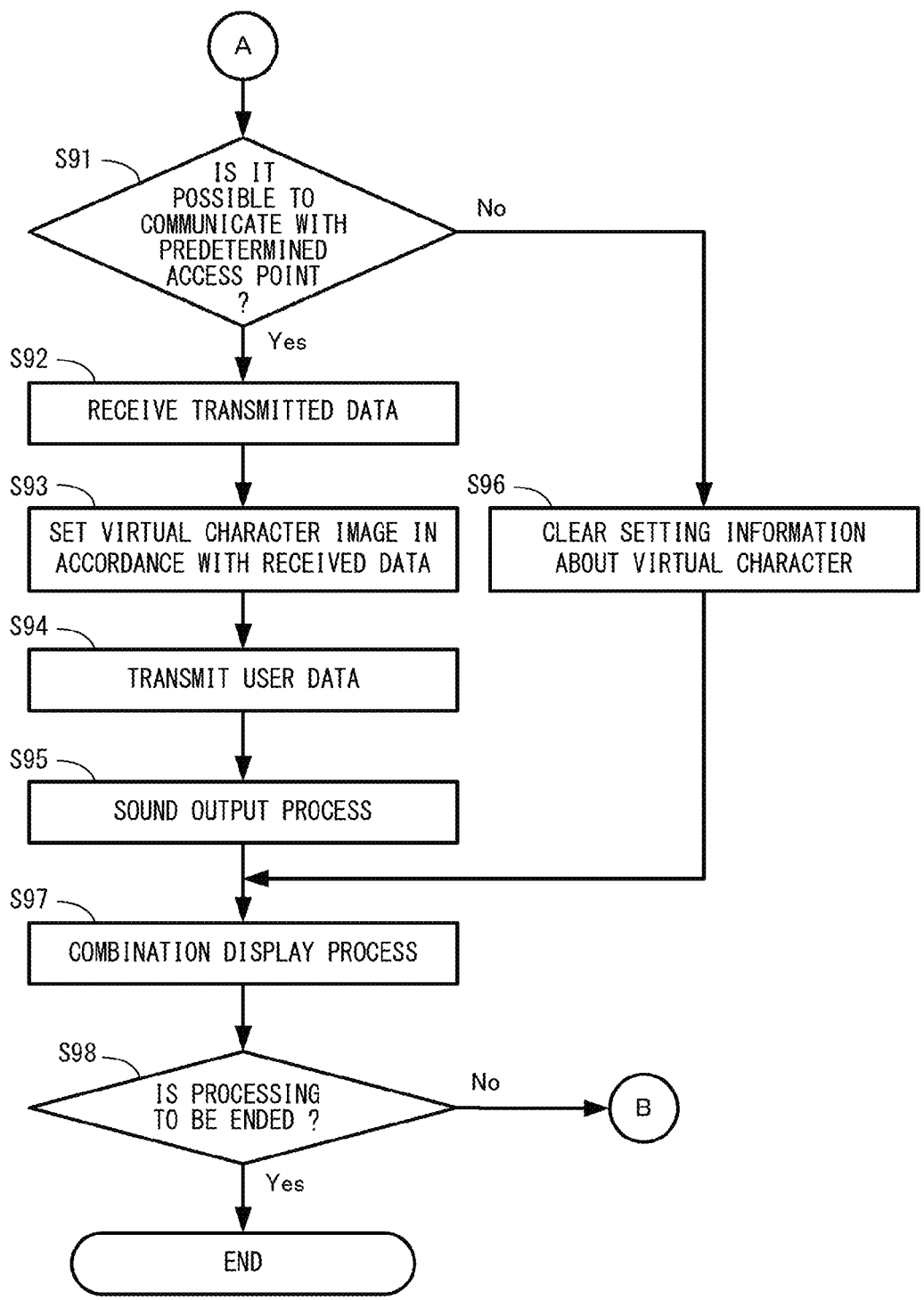
FIG. 11 is a flow chart showing a non-limiting example of the second half of the information processing performed by the information processing apparatus 5 (the CPU 55).

Next, with reference to FIGS. 10 and 11, the details of the processing performed by the information processing apparatus 5 are described. It should be noted that FIG. 10 is a flow chart showing an example of the first half of information processing performed by the information processing apparatus 5 (the CPU 55). FIG. 11 is a flow chart showing an example of the second half of the information processing performed by the information processing apparatus 5 (the CPU 55). Here, in the flow charts shown in FIGS. 10 and 11, a description is given mainly of, in the processing performed by the information processing apparatus 5 included in the above information processing system 1a, the process of, if a predetermined marker has been detected in a captured image, causing a virtual character PC to appear and displaying the resulting image on the LCD 52. Detailed descriptions of other processes not directly related to these processes are omitted. In the exemplary embodiment, a series of processes shown in FIGS. 10 and 11 are performed by the CPU 55 executing the information processing program stored in the program storage section 57.

It should be noted that the information processing shown in FIGS. 10 and 11 is started at any timing. For example, in accordance with the fact that the user has given an instruction to start the information processing, a connection with an access point may be established, and the execution of the information processing program may be started. At this time, a part or all of the information processing program is loaded into the memory 56 at appropriate timing and executed by the CPU 55. Consequently, the series of processes shown in FIGS. 10 and 11 is started. It should be noted that the information processing program is stored in advance in the program storage section 57 included in the information processing apparatus 5. Alternatively, in another exemplary embodiment, the information processing program may be acquired from a storage medium attachable to and detachable from the information processing apparatus 5 and stored in the memory 56, or may be acquired from another apparatus via a network such as the Internet and stored in the memory 56.

In addition, the processes of all the steps in the flow charts shown in FIGS. 10 and 11 are merely illustrative. Thus, the processing order of the steps may be changed, or another process may be performed in addition to and/or instead of the processes of all the steps, so long as similar results are obtained. Further, in the exemplary embodiment, the CPU 55 may perform the processes of some of the steps in the flow charts, and a processor or a dedicated circuit other than the CPU 55 may perform the processes of the other steps. Yet alternatively, a processor or a dedicated circuit other than the CPU 55 may perform the processes of all the steps in the flow charts.

Referring to FIG. 10, the CPU 55 performs an initialization process in the information processing (step 81), and the processing proceeds to the next step. For example, in the above step 81, the CPU 55 initializes parameters used in the information processing.

Next, the CPU 55 acquires captured image data representing a captured image output from the image capturing section 50 (step 82), and the processing proceeds to the next step. For example, the CPU 55 stores newly acquired captured image data representing a captured image, as the captured image data Da1 in the memory 56.

Next, the CPU 55 acquires sound data representing a sound input through the sound input section 54 and operation data representing the content of the operation performed on the operation section 51 (step 83), and the processing proceeds to the next step. For example, the CPU 55 stores newly acquired sound data and operation data as the sound data Da2 and the operation data Da3, respectively, in the memory 56.

Next, the CPU 55 performs a captured image recognition process using the captured image data acquired in the above step 82 (step 84), thereby determining whether or not a marker M is included in the captured image represented by the captured image data (step 85). Then, if the marker M is included in the captured image, the processing proceeds to step 86. If, on the other hand, the marker M is not included in the captured image, the processing proceeds to to step 91 (see FIG. 11). A description is given below of an example of the captured image recognition process performed in the above steps 84 and step 85.

For example, the CPU 55 performs an image recognition process, using a pattern matching technique or the like, on the captured image represented by the captured image data (typically, a captured image captured by the outer camera 501), thereby determining whether or not the marker M is included in the captured image. Then, if the marker M is included in the camera image, the CPU 55 assumes that the marker M exists in the real world in the image capturing range of the image capturing section 50. Then, based on the position and the orientation of the marker M in the captured image, the CPU 55 calculates the positional relationship between the image capturing section 50 and the marker M. As an example, the CPU 55 recognizes the position and/or the orientation of the marker M in the captured image, thereby calculating a marker-camera transformation matrix, and stores image recognition result data representing the marker-camera transformation matrix in the memory 56.

It should be noted that the marker-camera transformation matrix is a matrix that reflects the position and the orientation of the image capturing section 50 calculated based on the position and the orientation of the marker M in the captured image. More accurately, the marker-camera transformation matrix is a coordinate transformation matrix for transforming coordinates represented by a marker coordinate system (a coordinate system where the position of the marker M in the real world is the origin, and the vertical direction and the horizontal direction of the marker M and a direction normal to the marker M are axes) into coordinates represented by an image capturing section coordinate system based on the position and the orientation of the image capturing section 50 calculated based on the position and the orientation of the marker M in the captured image. Here, in AR (Augmented Reality) technology using a computer, the marker-camera transformation matrix for transforming the marker coordinate system into the image capturing section coordinate system is specified as the view matrix of a virtual camera, whereby it is possible to combine a real world image (a captured image) with a CG image (a virtual world image).

In step 86, in accordance with the marker M subjected to the image recognition, the CPU 55 generates a character image representing a virtual character PC to appear, and the processing proceeds to step 91 (see FIG. 11). For example, in accordance with the type of the marker M subjected to the image recognition and setting information set in the character data Db1 and the character setting data Dc, the CPU 55 sets the type and the action of a virtual character PC to appear. Then, the CPU 55 places the virtual character PC in a virtual space defined by the marker coordinate system (for example, places the virtual character PC at the origin of the marker coordinate system) and changes the size of the virtual character PC where necessary. It should be noted that if information is not set in the character data Db1 or the character setting data Dc, a character image representing the virtual character PC determined in advance in accordance with the type of the marker M subjected to image recognition may be generated, or the process of generating a character image may be skipped.

For example, in the process of step 86, the vertical direction in the marker coordinate system (a direction corresponding to the vertical direction in the real world along the marker plane in the example shown in FIGS. 2 and 3, or a direction corresponding to the vertical direction in the real world perpendicular to the marker plane in the example shown in FIGS. 6 to 8) is defined as the vertical direction in the virtual space, and the virtual character PC is placed in the virtual space. Then, based on the front, back, left, right, up, and down directions of the marker M and the setting information set in the character data Db1 and the character setting data Dc, the front, back, left, and right directions of the virtual character PC are determined.

Then, the CPU 55 generates as a character image the virtual character PC viewed from the virtual camera and stores the character image in the memory 55. For example, the CPU 54 specifies the marker-camera transformation matrix as the view matrix of the virtual camera, and thereby can display a CG model (the virtual character PC) represented by the marker coordinate system at the same position as the location where the CG model would be displayed on the LCD 52 if the CG model existed in the real world (e.g., a position a predetermined distance away from the marker M in the captured image). That is, in a display image to be displayed on the LCD 52, it is possible to display the virtual character PC placed in the virtual space defined by the marker coordinate system, as if the virtual character PC existed in association with the marker M in the real world.

Referring to FIG. 11, the CPU 55 determines whether or not the information processing apparatus 5 can communicate with a predetermined access point (e.g., the access point AP in the example of FIGS. 2 and 3, or the access point AP1 or the access point AP2 in the example of FIGS. 6 to 8) (step 91). For example, the CPU 55 searches for an access point by so-called passive scan or active scan, using an identifier for connecting to an access point. Next, if the predetermined access point has been detected and a connection with the access point has been established, the CPU 55 sets an apparatus (e.g., the operator terminal apparatus 200 in the example of FIGS. 2 and 3, or another information processing apparatus 5 that is the transmission destination in the example of FIGS. 6 to 8) set as a communication partner to and from which data is transmitted and received via the access point. Then, the CPU 55 starts communication. Then, the processing proceeds to step 92. On the other hand, if the predetermined access point has not been detected, or if a connection with the predetermined access point cannot be established, the processing proceeds to step 96.

In step 92, the CPU 55 receives data transmitted from the set apparatus that is the communication partner, and the processing proceeds to the next step. For example, the CPU 55 receives character data, sound data, operation data, and the like transmitted from the apparatus that is the communication partner, thereby updating the reception data Db of the memory 56.

Next, the CPU 55 sets the virtual character image in accordance with the data received in the above step 92 (step 93), and the processing proceeds to the next step. For example, with reference to the reception data Db, the CPU 55 acquires information about the virtual character PC transmitted from the apparatus that is the communication partner (information related to the type and the action of the virtual character PC). Then, the CPU 55 sets the type, the action, and the position of the virtual character PC and the like based on the acquired information, thereby updating the character setting data Dc.

Next, the CPU 55 transmits user data to the set apparatus that is the communication partner (step 94), and the processing proceeds to the next step. For example, the CPU 55 performs the process of extracting, from the user data Da, data to be transmitted and transmitting the extracted data to the set apparatus that is the communication partner.

Next, the CPU 55 performs a sound output process (step 95), and the processing proceeds to step 97. For example, with reference to the sound data Db2 included in the reception data Db, the CPU 55 generates a sound signal representing a sound input by the user of the apparatus that is the communication partner. Then, the CPU 55 outputs the generated sound signal to the sound output section 53, thereby outputting from the sound output section 53 the sound input by the user of the apparatus that is the communication partner.

On the other hand, if the predetermined access point has not been detected, or if a connection with the predetermined access point cannot be established (if the determination is negative in step 91), the CPU 55 clears the setting information about the virtual character PC (step 96), and the processing proceeds to step 97. For example, the CPU 55 erases the reception data Db and the character setting data Dc as the setting information about the virtual character PC.

In step 97, the CPU 55 performs a combination display process, and the processing proceeds to the next step. For example, if the marker M has been captured, the CPU 55 generates a display image by combining the captured image (a real world image) acquired in the above step 82 with the virtual character image generated in the above step 86 and displays the display image on the LCD 52.

Specifically, the CPU 55 draws the captured image acquired in the above step 82 (typically, an image captured by the outer camera 501) in a predetermined storage area (hereinafter referred to as a "frame buffer") in a VRAM for temporarily storing an image to be supplied to the LCD 52. Then, if the determination is affirmative in the above step 85, the CPU 55 overwrites in the frame buffer the virtual character image stored in the memory 56 (i.e., an image of the virtual space viewed from the virtual camera). This combines the virtual character image with the captured image (the real world image) drawn in the frame buffer. Then, the image drawn in the frame buffer is supplied to the LCD 52 at predetermined timing and displayed on the LCD 52. It should be noted that in the virtual character image, the background of the virtual space is transparent. Thus, the virtual character image is combined with the real world image, thereby generating an image in which the virtual character PC looks as if existing in the real world image. It should be noted that if the determination is negative in the above step 85, the CPU 55 draws only the captured image in the frame buffer and displays the drawn image on the LCD 52.

Next, the CPU 55 determines whether or not the processing is to be ended (step 98). Examples of conditions for ending the processing include the fact that the user has performed the operation of ending the processing. If the processing is not to be ended, the CPU 55 returns to the above step 82 and repeats the process thereof. If the processing is to be ended, the CPU 55 ends the processing indicated by the flow chart. Thereafter, the CPU 55 repeatedly performs a series of processes of steps 82 to 97 until it is determined in step 98 that the processing is to be ended.

It should be noted that in the above information processing systems 1a and 1b, a form has been used in which apparatuses for transmitting and receiving data directly communicate data via access points. Alternatively, data may be communicated via yet another apparatus (e.g., a relay server) or the like.

In addition, the above descriptions are given of the processing procedure used when a single information processing apparatus 5 performs information processing. Alternatively, another apparatus may perform at least some of the processing steps in the information processing. For example, if the information processing apparatus 5 is further configured to communicate with another apparatus (e.g., another server, another game apparatus, or another mobile terminal), the other apparatus may cooperate to perform the processing steps of the information processing. Another apparatus may thus perform at least some of the processing steps in the information processing, thereby enabling processing similar to the above information processing. Further, the above information processing can be performed by a processor or the cooperation of a plurality of processors, the processor or the plurality of processors included in an information processing system including at least one information processing apparatus 5. Further, in the above exemplary embodiment, the processing indicated in the above flow charts is performed by the CPU 55 of the information processing apparatus 5 executing a predetermined program. Alternatively, a part or all of the processing indicated in the flow charts may be performed by a dedicated circuit included in the information processing apparatus 5.

Here, the above variations make it possible to achieve the exemplary embodiment also by a system form such as so-called cloud computing, or a system form such as a distributed wide area network or a local area network. For example, in a system form such as a distributed local area network, it is possible to execute the processing between a stationary information processing apparatus (a stationary game apparatus) and a handheld information processing apparatus (a handheld game apparatus) by the cooperation of the apparatuses. It should be noted that, in these system forms, there is no particular limitation on which apparatus performs the process of each step of the above processing. Thus, it goes without saying that it is possible to achieve the exemplary embodiment by sharing the processing in any manner.

In addition, the processing orders, the setting values, the conditions used in the determinations, and the like that are used in the above information processing are merely illustrative. Thus, it goes without saying that the exemplary embodiment can be achieved also with other orders, other values, and other conditions.

In addition, each of the above programs may be supplied to the information processing apparatus 5 not only through an external storage medium such as the external memory, but also through a wired or wireless communication link. Further, the program may be stored in advance in a non-volatile storage device included in the information processing apparatus 5. It should be noted that examples of an information storage medium having stored therein the program may include CD-ROMs, DVDs, optical disk storage media similar to these, flexible disks, hard disks, magneto-optical disks, and magnetic tapes, as well as non-volatile memories. Alternatively, an information storage medium having stored therein the program may be a volatile memory for storing the program. It can be said that such a storage medium is a storage medium readable by a computer or the like. For example, it is possible to provide the above various functions by causing a computer or the like to load a program from the storage medium and execute it.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. It should be understood that, when used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

As described above, the exemplary embodiment is useful as, for example, an information processing system, an information processing apparatus, an information processing program, an information processing method, and the like in order, for example, to enhance interest when displaying a virtual object corresponding to an image capturing target.

What is claimed is:

1. An information processing system including an information processing apparatus for displaying a virtual object image in a real space image and another apparatus capable of communicating with the information processing apparatus,
   each of the information processing apparatus and the another apparatus comprising one or more processors,
   the one or more processors of the information processing apparatus configured to:
      acquire a captured image of a real space obtained by an image capturing apparatus;
      detect a feature in the captured image of the real space;
      retrieve, from storage associated with the information processing apparatus, data for a virtual object corresponding to the detected feature;
      display, along with the captured image and based on position and orientation of the detected feature, a virtual object image including the virtual object corresponding to the detected feature;
      after the virtual object image is displayed, transmit, to the another apparatus, data including captured image information of the captured image; and
   the one or more processors of the another apparatus configured to receive control data for controlling the virtual object, the control data corresponding to an input made to the another apparatus;
   the one or more processors of the another apparatus configured to set a display form of the virtual object in accordance with the control data, wherein setting the display form includes setting an action of the virtual object in accordance with the control data;
   the one or more processors of the another apparatus further configured to transmit data representing the set display form of the virtual object and/or the control data to the information processing apparatus; and
   the one or more processors of the information processing apparatus configured to display, based on the set display form of the virtual object and along with the captured image, the action for the virtual object.

2. The information processing system according to claim 1, wherein
   the input is made to an input apparatus of the another apparatus.

3. The information processing system according to claim 1, wherein
   the data representing the display form and/or the control data are allowed to be transmitted to the information processing apparatus if the information processing apparatus is located at a particular place.

4. The information processing system according to claim 3, wherein
   the data representing the display form and/or the control data are allowed to be transmitted to the information processing apparatus if the information processing apparatus is located at the particular place and the another apparatus is located at another particular place different from the particular place.

5. The information processing system according to claim 3, wherein
   the virtual object is set uniquely for the particular place.

6. The information processing system according to claim 3, wherein
   the data is allowed to be transmitted to the information processing apparatus if the another apparatus can communicate with the information processing apparatus via a particular access point installed at the particular place.

7. The information processing system according to claim 1, wherein
   setting the display form includes selecting, by a user of the another apparatus, the action for the virtual object from a plurality of different actions available for the virtual object.

8. The information processing system according to claim 1, wherein
   the one or more processors of the information processing apparatus are further configured to:
      acquire an image of a user of the information processing apparatus captured in real time by the image capturing apparatus or an image capturing apparatus different from the image capturing apparatus; and
      transmit data representing the image of the user to the another apparatus, and
   the one or more processors of the another apparatus are further configured to:
      acquire the data transmitted from the information processing apparatus; and
      display the image of the user of the information processing apparatus on a display apparatus, using the data acquired from the information processing apparatus.

9. The information processing system according to claim 1, wherein
   the one or more processors of the other apparatus are further configured to:
      acquire a sound input to the another apparatus, and
      transmit, to the information processing apparatus, data representing the sound input to the another apparatus;
   the one or more processors of the information processing apparatus are further configured to:
      acquire, from the another apparatus, the data representing the sound input to the another apparatus transmitted;
      output a sound corresponding to the sound input transmitted from the another apparatus;
      acquire a sound input to the information processing apparatus; and
      transmit, to the another apparatus, data representing the sound input to the information processing apparatus, and
   the one or more processors of the another apparatus are further configured to:
      acquire, from the information processing apparatus, the data representing the sound input to the information processing apparatus transmitted; and
      output a sound corresponding to the sound input transmitted from the information processing apparatus.

10. The information processing system according to claim 1, wherein
    data representing a sound input to the another apparatus is acquired as the control data, the action of the virtual object is set based on the sound input to the another apparatus, data representing the sound input to the another apparatus is further transmitted to the information processing apparatus, and the one or more processors of the information processing apparatus are further configured to output a sound corresponding to the sound input transmitted from the another apparatus.

11. The information processing system according to claim 1, wherein the information processing apparatus is configured to communicate with the another apparatus via an access point, the information processing apparatus is located in the vicinity of the access point and is configured to wirelessly communicates with the access point, and a position of the virtual object is determined based on (1) a radio field intensity of access point determined by the one or more processors of the information processing apparatus and (2) position of the access point in the real space.

12. An information processing apparatus for displaying a virtual object image in a real space image, the information processing apparatus comprising one or more processors configured to:

acquire a captured image of a real space captured by an image capturing apparatus;

detect a feature in the captured image of the real space;

retrieve, from storage associated with the information processing apparatus, data for a virtual object corresponding to the detected feature;

display, along with the captured image and based on position and orientation of the detected feature, a virtual object image including the virtual object corresponding to the detected feature;

while the virtual object image is displayed:
  transmit, to another apparatus, data including captured image information of the captured image; and
  receive, from the another apparatus, data representing a display form of the virtual object set based on control data, representing an input made to the another apparatus, for controlling the virtual object, wherein the display form includes an action of the virtual object; and display, based on the received data representing the set display form of the virtual object, the action for the virtual object.

13. The information processing apparatus of claim 12, wherein the one or more processors are further configured to: while the virtual object image is displayed, (1) receive sound input to the information processing apparatus and operation information of operations performed on the information processing apparatus, and (2) transmit, to the another apparatus, data including sound input information of the sound input to the information processing apparatus and the operation information.

14. An information processing apparatus for displaying a virtual object image in a real space image, the information processing apparatus comprising one or more processors configured to:

acquire a captured image of a real space captured by an image capturing apparatus;

detect a feature in the captured image of the real space;

retrieve, from storage associated with the information processing apparatus, data for a virtual object corresponding to the detected feature;

display, along with the captured image and based on position and orientation of the detected feature, a virtual object image including the virtual object corresponding to the detected feature;

while the virtual object image is displayed:
  transmit, to another apparatus, data including captured image information of the captured image; and
  receive, from the another apparatus, control data, representing an input made to the another apparatus, for controlling the virtual object; and set a display form of the virtual object in accordance with the received control data, wherein setting the display form includes setting an action of the virtual object; and display, based on the set display form of the virtual object, the action for the virtual object.

15. A non-transitory computer-readable storage medium having stored therein an information processing program executed by a computer included in an information processing apparatus for displaying a virtual object image in a real space image, the information processing program, when executed, causing the computer to execute:

acquiring a captured image of a real space captured by an image capturing apparatus;

detecting a feature in the captured image of the real space;

retrieving from storage associated with the information processing apparatus, data for a virtual object corresponding to the detected feature;

displaying, along with the captured image and based on position and orientation of the detected feature, a virtual object image including the virtual object corresponding to the detected feature;

while the virtual object image is displayed:
  transmitting, to another apparatus, data including captured image information of the captured image; and
  receiving, from the another apparatus, data representing a display form of the virtual object set based on control data, representing an input made to the another apparatus, for controlling the virtual object, wherein the display form includes an action of the virtual object; and displaying, based on the received data representing the set display form of the virtual object, the action for the virtual object.

16. A non-transitory computer-readable storage medium having stored therein an information processing program executed by a computer included in an information processing apparatus for displaying a virtual object image in a real space image, the information processing program, when executed, causing the computer to execute:

acquiring a captured image of a real space captured by an image capturing apparatus;

detecting a feature in the captured image of the real space;

retrieving, from storage associated with the information processing apparatus, data for a virtual object corresponding to the detected feature;

displaying, along with the captured image and based on position and orientation of the detected feature, a virtual object image including the virtual object corresponding to the detected feature;

while the virtual object image is displayed:
  transmitting, to another apparatus, data including captured image information of the captured image;
  receiving, from the another apparatus, control data, representing an input made to the another apparatus, for controlling the virtual object; and setting a display form of the virtual object in accordance with the received control data, wherein setting the display form includes setting an action of the virtual object; and displaying, based on the set display form of the object, the action for the virtual object.

17. An information processing method performed by a processor or cooperation of a plurality of processors, the processor or the plurality of processors included in an information processing system including an information processing apparatus for displaying a virtual object image in a real space image and another apparatus capable of communicating with the information processing apparatus, the information processing method comprising:
   acquiring, by the information processing system, a captured image of a real space captured by an image capturing apparatus;
   detecting, by the information processing system, a feature in the captured image of the real space;
   retrieving, by the information processing system and from storage associated with the information processing apparatus, data for a virtual object corresponding to the detected feature;
   displaying, along with the captured image and based on position and orientation of the detected feature, a virtual object image including the virtual object corresponding to the detected feature;
   while the virtual object image is displayed:
   transmitting to another apparatus, by the information processing system, data including captured image information of the captured image;
   acquiring control data for controlling the virtual object, the control data representing an input made to the another apparatus; and
   setting a display form of the virtual object in accordance with the control data, wherein the set display form includes an action of the virtual object set in accordance with the control data; and
   displaying, based on the set display form of the object, the action for the virtual object.

18. An information processing apparatus comprising:
   a camera;
   a display; and
   one or more hardware processors coupled to the camera and the display, the one or more processors configured to at least:
      receive a real space image captured by the camera;
      display, on the display, the real space image;
      detect a feature in the real space image;
      receive, from another apparatus, object data for a virtual object corresponding to the detected feature;
      display the real space image and the virtual object corresponding to the detected feature as a combined image, a position of the virtual object in the combined image being based on one or both of a position and an orientation of the detected feature in the real space image;
      while the combined image is displayed:
      transmit to the another apparatus, input data corresponding to one or more inputs to the information processing apparatus;
      receive, from the another apparatus, based on input to the another apparatus in response to the transmitted input data, virtual object control data for controlling the virtual object; and
      control the virtual object in the combined image in accordance with the received virtual object control data.

19. The information processing apparatus of claim 18, wherein the information processing apparatus is configured to communicate with the another apparatus via an access point, the information processing apparatus is located in the vicinity of the access point and is configured to wirelessly communicate with the access point, and the virtual object is displayed when the information processing apparatus is within a wireless communication range of the access point.

20. The information processing apparatus of claim 19, wherein the feature in a real space corresponding to the captured real space image is within the wireless communication range of the access point.

21. The information processing apparatus of claim 19, wherein the captured real space image includes the feature and image of the access point.

22. The information processing apparatus of claim 18, wherein the one or more processors are further configured to communicate with the another apparatus via an access point configured for wireless communication with the information processing apparatus and located in the vicinity of the feature in a real space captured by the camera, and wherein the virtual object is displayed only if the object data for the virtual object is received from the another apparatus via the access point.

* * * * *